United States Patent [19]

Denizou

[11] Patent Number: 4,714,582

[45] Date of Patent: Dec. 22, 1987

[54] ACTUATING DEVICE FOR LINEARLY MOVING A CLUSTER OF CONTROL ELEMENTS IN A NUCLEAR REACTOR

[75] Inventor: Jean-Pierre Denizou, Craponne, France

[73] Assignee: Fragema, Courbevoie, France

[21] Appl. No.: 816,781

[22] Filed: Jan. 7, 1986

[51] Int. Cl.[4] .............................................. G21C 7/06
[52] U.S. Cl. .................................... 376/233; 376/235; 376/237; 376/239; 294/86.26; 294/906
[58] Field of Search .............. 376/233, 235, 237, 239; 294/86.26, 86.31, 86.32, 906

[56] References Cited

U.S. PATENT DOCUMENTS 4,073,684  2/1978  Cepkauskas ......................... 376/233

FOREIGN PATENT DOCUMENTS 150368  8/1984  Japan ................................... 376/233

Primary Examiner—Donald P. Walsh
Attorney, Agent, or Firm—Pollock, Vande Sande & Priddy

[57] ABSTRACT

A device for moving a cluster of nuclear reactor control elements, more especially usable for changing the moderation rate of a nuclear reactor, comprising a vertical shaft having nippers cooperating with grabs integral with sub-clusters. Each grab comprises resilient fingers engageable with the nippers and lockable by snap fitting on the fixed upper structure. Each nipper is formed so as to engage resilient fingers and unlock them from the upper structure when the nipper is raised above the position which causes locking of the grab on the structure. A fixed lower structure is provided for causing forced disengagement of the nipper when this latter is lowered beyond the rest position of the grab on this structure. Raising of the nipper then drives the grab by simple bearing force.

13 Claims, 8 Drawing Figures

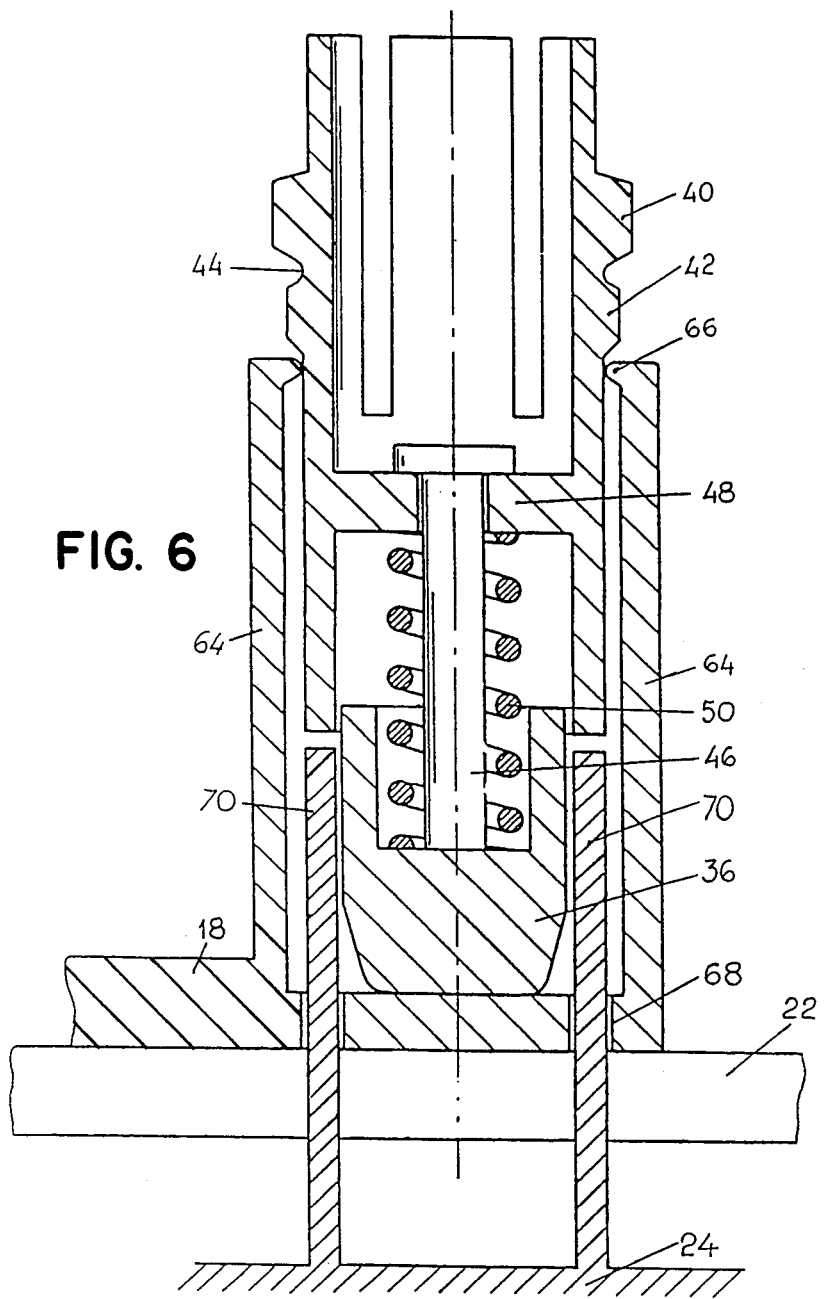

ACTUATING DEVICE FOR LINEARLY MOVING A CLUSTER OF CONTROL ELEMENTS IN A NUCLEAR REACTOR

BACKGROUND OF THE INVENTION

1. Technical Field

The invention relates to a device for linearly moving a cluster of control elements vertically into and out of the core of a nuclear reactor suitable for use when the cluster belongs to a set of two coaxially movable clusters fulfilling different functions.

2. Prior art

Providing such sets makes it possible to improve fine control, power adjustment, compensation of fuel burn-up and shut down of a nuclear reactor. Different set arrangements have been proposed, including sets in which one of the clusters is formed of so-called "black" elements having a very high neutron absorption and the other cluster is formed of "grey" elements. The cluster of "black" elements is lowered into the core of the reactor for causing and maintaining shut down. A motion device may be provided which is partially common to the clusters (French 2,106,373). It has also been proposed to associate a separate device with each cluster (French 2,537,764). But none of the prior arrangements allows full freedom of movement of one of the clusters, whatever the endmost positions occupied by the other cluster except at the expense of complex mechanisms.

SUMMARY OF THE INVENTION

It is an object of the invention to provide a device for vertically moving a cluster of control elements in the core of the nuclear reactor suitable for (i) moving and holding the cluster into either of its endmost positions and (ii) leaving full freedom of adjustment of another cluster of the same set whatever the end position of the first cluster, while being simple in construction.

To this end, an actuating device comprises an axially movable vertical shaft formed with prehension means arranged for cooperating with at least one grab fast with a cluster to be moved vertically, by engagement of the grab with the prehension means or by resilient locking of fingers of the grab on the prehension means. The fingers are provided so that the prehension means engage therewith and disconnect them from an upper structure when said means are moved upwardly beyond a position which causes locking of the grab on the fixed upper structure. A fixed lower structure is provided for causing forced uncoupling of the prehension means when the latter are lowered beyond the rest position of the grab on the lower fixed structure, an upward movement of the prehension means then driving the grab due to a bearing force.

The prehension means may be limited to a rigid nipper comprising blades for locking on the fingers and a bottom pierced with passages for pins integral with the fixed lower structure and to be left there; it also allows the cluster to be deposited in the low position; while leaving complete freedom of movement to the other cluster. The movements of the first cluster are made independent of those of the other cluster, which will generally be formed by regulating elements.

The invention will be better understood from the following description of a particular embodiment given by way of example only. The description refers to the accompanying drawings.

SHORT DESCRIPTION OF THE DRAWINGS

Figure 7:
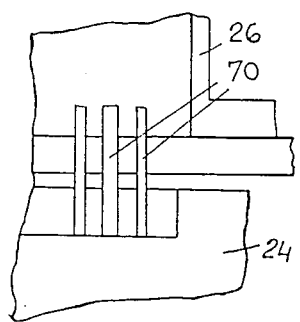
Figure 8:
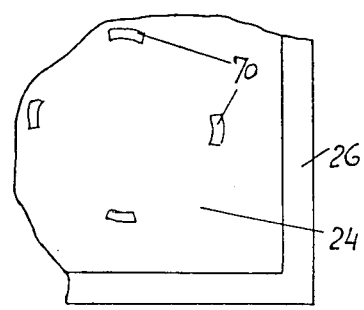
Figure 3:
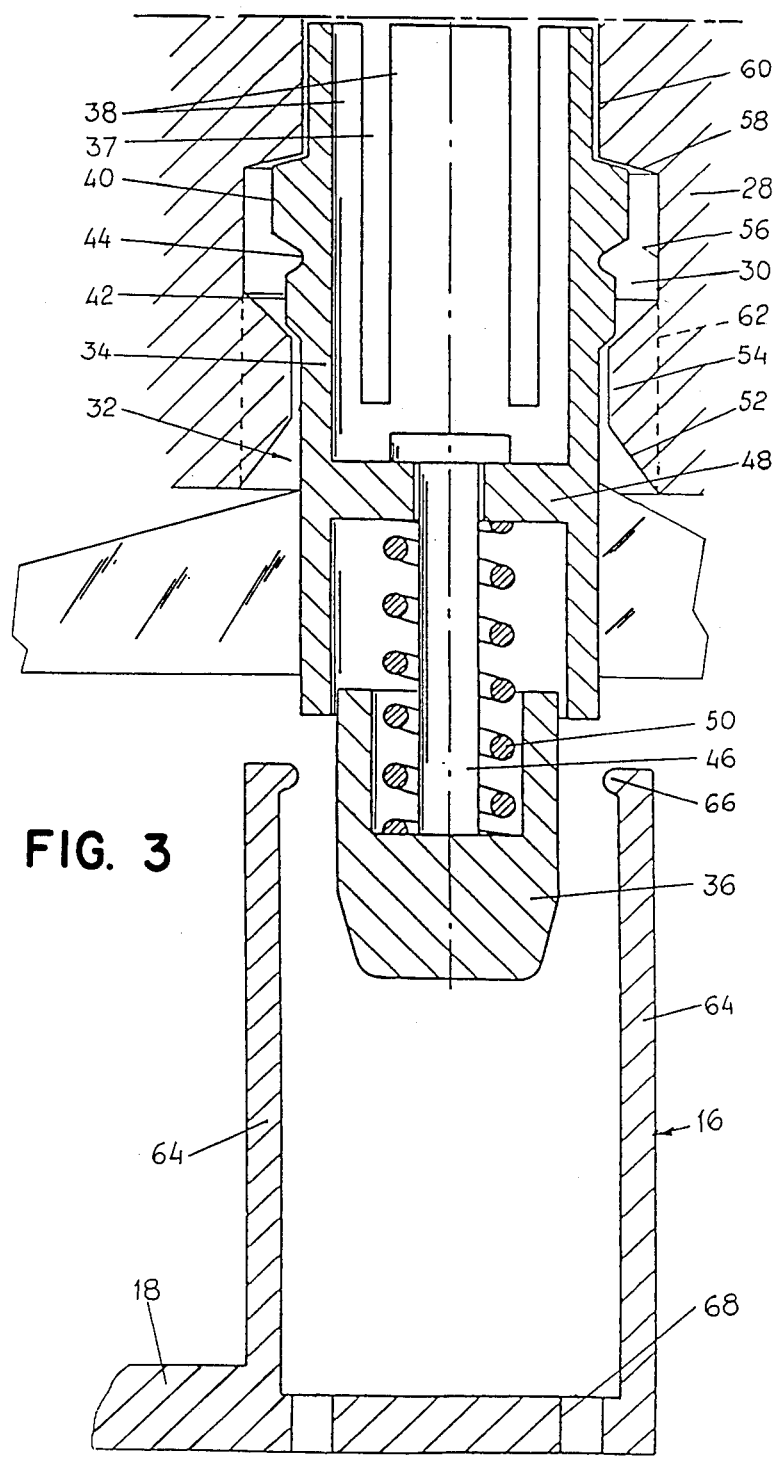
FIG. 3 is an enlarged detail view, in section through a vertical plane, showing one of the grabs of the device engaged with the upper fixed structure (position shown with broken lines in FIG. 1)
Figure 4:
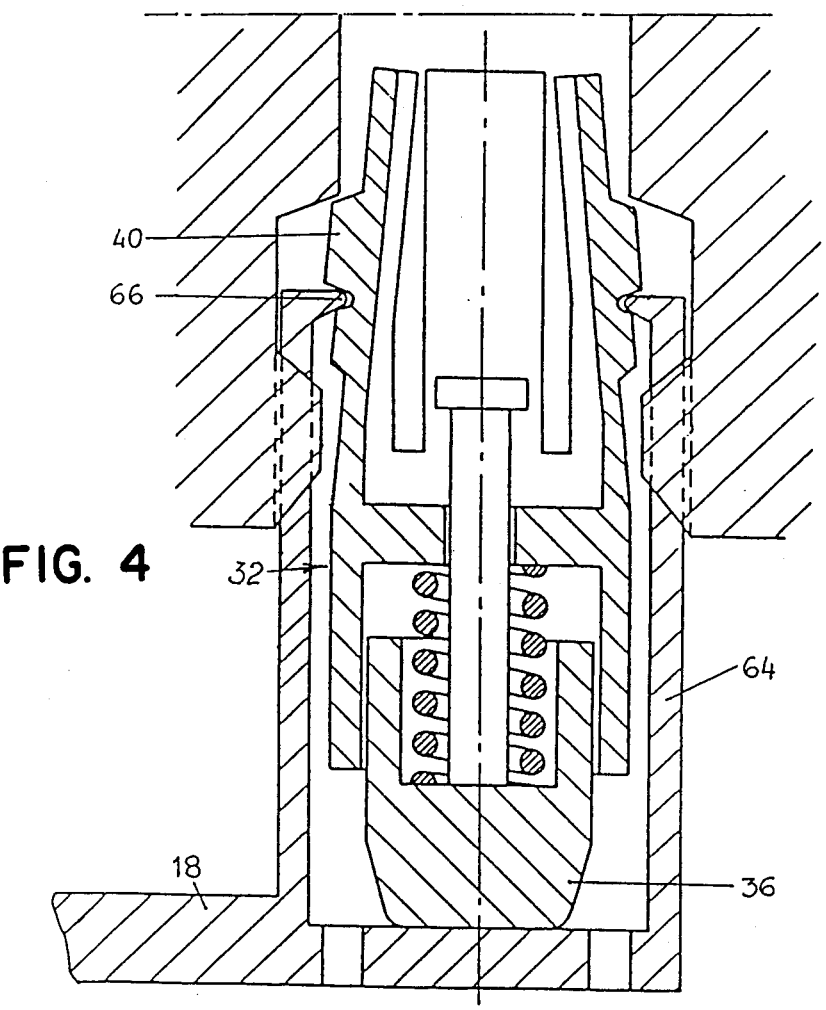
Figure 5:
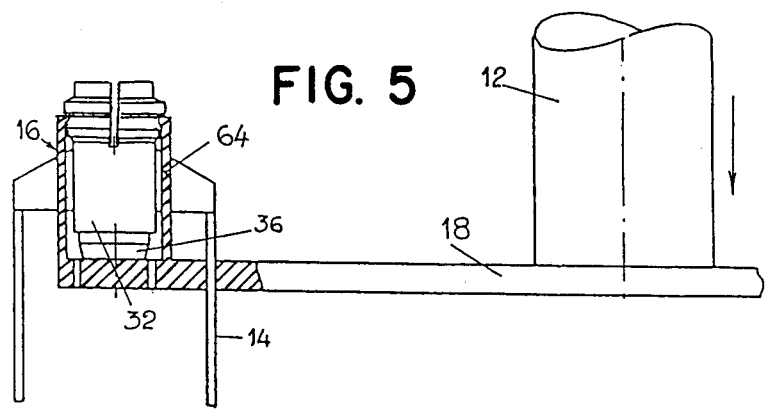

FIG. 4, similar to FIG. 3, shows one of the grabs during unlocking and disengagement from the upper structure;

FIG. 5 is a detail view showing the nipper of a sub-cluster engaged with the grab, during lowering thereof;

FIG. 6, similar to FIGS. 3 and 4, shows disengagement of the nipper when this latter reaches its bottom end of travel, the grab bearing on the fixed lower structure; and FIGS. 7 and 8 are diagrams showing, respectively in elevation and in a top view, a variant of the unlocking fingers of the grab.

DETAILED DESCRIPTION OF THE INVENTION

Figure 1:
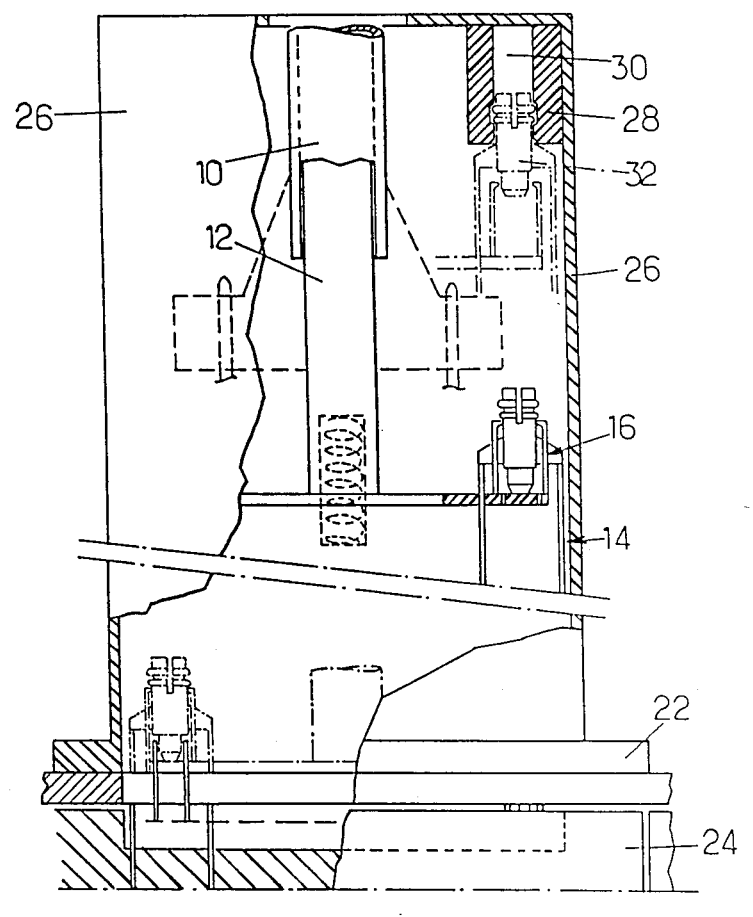
FIG. 1 is a general diagram, in elevation, showing the main components of a device according to the invention, placed in different positions in the upper internal structures of the core of a reactor, the grab being shown with continuous lines when supported by a nipper or gripper, with broken lines when hooked onto an upper fixed structure.
Figure 2:
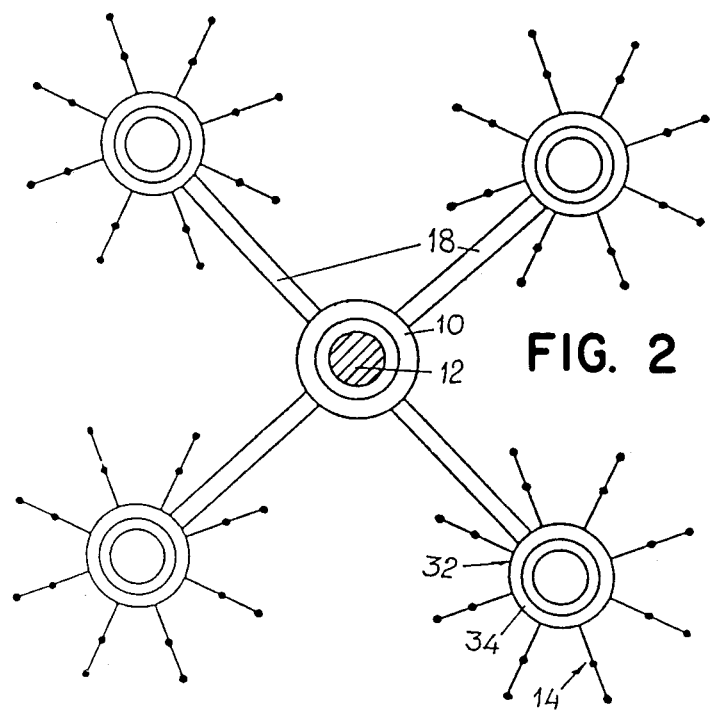
FIG. 2 is a top view showing the cross piece of the device with four sub-cluster nippers which it carries.

Referring to FIGS. 1 and 2, an actuating device for moving a cluster constitutes part of the mechanism for controlling a set of two clusters of vertically movable control elements and engaging them more or less deeply in a same fuel assembly of a reactor. Hereafter, that one of the two clusters which is moved by the device will be called "lower cluster" and the other "upper cluster". However, under certain operating conditions, the so-called upper cluster may be situated below the other.

The upper cluster (not shown) may typically comprise elongated elements or rods containing a neutron poison and be used for adjusting the power of the reactor. The upper cluster is carried by a tubular drive shaft 10 slidably received in a tube (not shown) projecting through the cover of the reactor vessel. Shaft 10 is controlled by drive means which may have a number of different constructions. The drive means may for example be one of those described in French Pat. Nos. 2,537,764, 2,232,820, 2,106,373 to which reference may be made.

The lower cluster is arranged for connection to and disconnection from a drive shaft 12, coaxial with shaft 10. As shown in FIG. 2, the lower cluster comprises four sub-clusters 14 (this number not being limitative) of sixteen elements each. Each of the sub-clusters 14 cooperates with associated gripping means formed by a nipper or gripper 16 fixed to an arm of a cross piece 18 fixed to the shaft 12 (FIGS. 1 and 2). The nature of the elongated elements forming the sub-clusters will depend on the contemplated use. The elements may contain a high proportion of neutron absorbing material, when the lower cluster is shutting down the reactor. The cluster may also comprise moderating or neutron-transparent material, when it is desired for example to modify the moderation ratio of the reactor during the life of this latter. They may contain fertile material in place of or in addition to other materials. The drive shaft 12 has at its lower part a resilient shock damper 20, which comes into contact with the upper core plate 22 during downward movement of shaft 12 supporting the clusters and which slows down the end travel in case of free fall of the shaft.

Each set of two clusters associated with a fuel assembly, such as the assembly whose upper end piece or nozzle 24 is shown in FIG. 1, is associated with stationary retaining and guide means belonging to the internals of the reactor. The guide means comprise a guide tube 26 fixed to the upper core plate of the reactor (which is part of the upper internals of the reactor) and having an upper structure 28 in which are formed housings 30 each for receiving a grab 32. In the embodiment as described, the upper core plate forms a lower structure supporting the cross piece 18 and the sub-clusters 14 when they are in their lower position.

The actuating device comprises a grab 32 for each sub-cluster 14. Each grab may have the construction as shown in FIGS. 3 to 6. The elongated elements of the sub-clusters are suspended from radial arms of the tubular body 34 of the grab. The top part of the tubular body 34 is split up, by slits 37 parallel to the axis and spaced apart at regular intervals, into flexible fingers 38. Each flexible finger has two projections 40 and 42 separated by an intermediate groove 44. The lower part of the body 34 slidably receives a stop member 36 carried by a pin 46 limiting downward movement of the stop away from a transverse partition 48 of the body. A return spring 50 urges stop 36 towards the lower position in which it is shown in FIGS. 1 and 3. Spring 50 is thus retained under a prestress, so calibrated that the spring contracts and allows stop 36 to move with respect to body 34 only when subjected to a force greater than the weight of the sub-cluster and to the snap engagement force of the body 34 of the sub-cluster 32 in housing 30.

The housing 30 for receiving each grab in the upper structure 28 has a rotational symmetry. It comprises, from bottom to top, an entrance chamfer 52, an internal flange 54, a recess or counterbore 56 and a shoulder 58 connecting with a portion 60 of a smaller diameter than that of flange 54. Grooves 62, four in number as illustrated, divide up flange 54 at regular angle intervals. Their depth is such that their bottom is in alignment with that of the recess 56 and their function will be discussed further on. The axial dimension of recess 56 is such that it may receive both projections 40 and 42 together, as shown in FIG. 3.

Each of the nippers 16, carried by arms of the cross piece 18, comprises four rigid blades 64 whose dimensions and mutual spacing are such that they may engage grooves 62 of housing 30 during upward movement of the nipper. Each of blades 64 ends with a latching lip 66 arranged for passing between the arms of the grab 32 and for:

abutment with the projection 42, for supporting the grab 32, insertion into the intermediate groove 44 of the grab so as to connect the nipper 16 to grab 32, when the nipper is raised into the grab while the grab is in its upper abutment condition.

The bottom wall of nipper 16 is formed with several holes 68 distributed about the vertical axis of the nipper, opposite the tubular body 34 of the grab. Holes 68 are located for providing a passage for fingers 70 arranged for forcibly disengaging the nipper. In the embodiment shown in FIG. 6, fingers 70 are carried by the end nozzle 24 of the fuel assembly which forms the lower fixed structure of the device. However, other arrangements are possible. Fingers 70 have a sufficient length for retaining the body 34 of grab 32 against axial movement when the latter is pulled downwardly by nipper 16 engaged with fingers 38.

The operation of the device during the different possible phases is as follows.

Locking of the grab in top position

First, the upper cluster should be moved to its top "over travel" position, i.e. to a position which is above the top position in which it will later be retained.

Locking of the grab in the top position automatically occurs by snap action upon upwardly moving the nipper 16 on which the grab simply rests (FIG. 1). The projections 40 of fingers 38 first engage the entrance chamfer 52. Upon continued upward movement of the nipper 16, the force transmitted from the nipper to the grab through stop 36 and spring 50 is sufficient for bending fingers 38 inwardly while projections 40 slide over the chamfer. As soon as projections 40 and 42 confront the recess 56, the fingers revert to their original shape and the projections snap into position and lock the grab. Upward movement of nipper 16 is then stopped.

Cross piece 18 may then be moved down (FIG. 3) to its lower position, thus completely freeing the path of the other cluster. Grabs 32 and the sub-clusters 14 remain in their top position.

Unlocking and lowering

In order to bring the cluster to the low position, the cross piece 18 is raised. Lips 66 engage projection 42 and the bottom wall of nipper 16 comes into abutment against stop 36. Upon further upward movement of nipper 16, spring 50 is compressed and simultaneously fingers 38 are forced radially inwardly by the rigid blades 64 guided by recess 56 and grooves 62. Lips 66 snap into groove 44 whose depth is such that the projections 40, still in abutment against shoulder 58, have a size less than the passage area left free by flange 54 (FIG. 4). If then shaft 12 and cross piece 18 are lowered, they then carry the grab 32 engaged with nippers 16 and the sub-clusters 14 (Figure 5).

The cross piece may thus be lowered as far as the lower position defined by abutment of the tubular body 34 of grab 32 on pins 70.

Disconnection and raising

When it is desired to move the sub-clusters 14 back to their top position, grabs 32 are first of all disengaged from nippers 16. Disconnection is effected by moving shaft 12 down by an additional extent. The body 34 of grab 32 is then retained by the fixed pins 70 and lips 66 escape downwardly, while temporarily bending the resilient fingers 38. As soon as the lips have left grooves 34, spring 50 raises the grab which comes into the position shown in FIG. 6, bearing on lips 66 and through stop 36, on the bottom of the nipper.

Stop 36, arranged to rest on the bottom wall of nipper 16, fulfils two functions:

When the grab is engaged with the nipper (FIG. 5) the stop holds the grab in a well defined position with respect to the nipper, since the compression force of the spring is less than the resilient locking force. The stop takes up possible lost motion and avoids shocks and fatigue effects.

The resilient stop in addition relieves pins 70 when two-way connection changes to a simple bearing contact. In fact, spring 50 whose precompression force is greater than the weight of the sub-cluster, assists pins 70 in their action.

It will be appreciated that the device moves the sub-clusters into their upper connection position. They may leave them and bring them back to the lower position, so making the sub-clusters completely independent of the movement of an additional cluster consisting of neutron absorbing control elements. It is important to note that the whole of the engaging and disengaging, locking and unlocking operations is controlled solely by movements of the nipper, without any auxiliary member. The control mechanisms may therefore be very simple and may be of existing types which provide a largely sufficient positioning accuracy for blindly effecting the different operations required.

I claim:

1. For use in a nuclear reactor having an upper stationary structure, a lower stationary structure and a core under said lower stationary structure,
   an actuating device for vertically moving a cluster of control elements between an upper position in engagement with said upper stationary structure and a lower position where said cluster is retained by said lower stationary structure, said actuating device comprising:
   a vertical shaft movable along its axis and comprising gripping means at the lower end thereof,
   grab means fast with said cluster and located at a top end thereof, said grab means having resilient fingers arranged to engage said gripping means and to be latched by snap fitting on the upper stationary structure in a predetermined position,
   said gripping means being so shaped as to engage with said resilient fingers when the latter are unlatched from said upper structure and when said gripping means are raised beyond the predetermined position which causes locking of the grab on the upper stationary structure, whereas said lower fixed structure is arranged for causing forced disengagement of said gripping means when the latter are lowered by said shaft beyond a rest position of the grab means on said lower stationary structure, raising of the gripping means then driving the grab means by a simple abutment force.

2. A device according to claim 1, wherein the gripping means comprise a rigid nipper comprising rigid blades for connection with said resilient finger and a bottom wall formed with passages for pins fast with an upper end nozzle of a fuel assembly and arranged to force out the grab means.

3. A device according to claim 2, wheren said grab means comprise a tubular body split up so as to form said resilient fingers and having a lower part cooperating with said pins and a resilient stop intended to bear on the nipper and having a prestress force greater than the weight of the grab means and greater than the snap engagement force of the latter end of the cluster and wherein the upper stationary structure comprises a grab housing having an annular recess defined by a downwardly facing shoulder on which the resilient fingers bear and by a flange for locking projections of the fingers.

4. A device according to claim 3, further comprising grooves formed in said flange for allowing the passage of the rigid blades, wherein said blades comprise endmost lips intended to cause bending of the fingers during raising of the nipper when the grab is resting thereon, until the lips are engaged in a groove of the fingers, the bending being sufficient for freeing the fingers from the recess and from the flange.

5. A device according to claim 3, wherein said cluster is formed of a plurality of independent sub-clusters, distributed about the vertical shaft and each associated with a grab supported by a cross piece fixed to the shaft and constituting part of said grab means.

6. A device according to claim 2, wherein the pins are carried by the upper core plate of the reactor.

7. A device according to claim 2, wherein said pins are carried by an upper end nozzle of a fuel assembly associated with the cluster.

8. A device according to claim 1, wherein said cluster is formed of elements containing neutron absorbing material.

9. A device according to claim 1, wherein said cluster is formed of elongated elements containing fertile material.

10. A device according to claim 5, wherein said vertical shaft is disposed coaxially with a second shaft connected to a cluster of elements for controlling the reactivity of the reactor.

11. For use in a nuclear reactor having an upper stationary structure, a lower stationary structure and a core under said lower stationary structure,
    an actuating and locking device for vertically moving a cluster of control elements between an upper position in engagement with said upper stationary structure and a lower position where said cluster is retained by said lower stationary structure, said actuating device comprising:
    a longitudinally movable vertical drive shaft;
    gripping means fast with the lower end of said drive shaft and including a plurality of upwardly directed rigid blades having radial locking lips at an upper free end thereof,
    grab means fast with said cluster, located at a top end thereof and including a plurality of upwardly directed resilient fingers, said fingers having radially directed latching projections,
    recess means formed in said upper structure and dimensioned to receive said latching projections for resiliently locking said grab means in said upper structure,
    wherein said blades and gripping means are mutually proportioned for said lips to abut said latching projections in an abutment position and to carry said grab means and cluster upon upward movement of said gripping means; for said lips to upwardly force said latching projections into said upper structure until they snap into said recess; and for said lips to slide over said latching projections and to resiliently bend said fingers inwardly upon continued upward movement of the gripping means from the abutment position while said latching projectons are retained in said recess for forcing said latching projections radially inwardly and disengaging said latching projections from said recess.

12. For use in a nuclear reactor having an upper stationary structure, a lower stationary structure and a core under said lower stationary structure,
    an actuating and locking device for vertically moving a cluster of control elements between an upper position in engagement with said upper stationary structure and a lower position where said cluster is retained by said lower stationary structure, said actuating device comprising:

a longitudinally movable vertical drive shaft;

gripping means fast with the lower end of said drive shaft and including a plurality of upwardly directed rigid blades having radial locking lips at an upper free end thereof, grab means fast with said cluster, located at a top end thereof and including a plurality of upwardly directed resilient fingers, formed with groove means shaped to receive said lips and to exert a radial expansion force on said fingers for mutually locking said fingers and blades with a predetermined resilient force, said fingers having radially directed latching projections, recess means formed in said upper structure and dimensioned to receive said latching projections for resiliently lockings said grab means in said upper structure, wherein said blades and gripping means are mutually proportioned for said lips to abut said latching projections in a predetermined relative abutment position and to carry said grab means and cluster upon upward movment of said gripping means; for said lips to upwardly force said latching projections into said upper structure until they snap into said recess; and for said lips to slide over said latching projections and to resiliently bend said fingers inwardly upon continued upward movement of the gripping means from the abutment position while said latching projections are retained in said recess for radially inwardly disengaging said latching projections from said recess, and wherein said lower fixed structure has a plurality of pins arranged for abutting connection with said gripping means and for causing forced disengagement of said groove means from said lips when said gripping means are lowered by said shaft beyond a rest position of said gripping means.

13. An actuating device according to claim 12, wherein each of said radially directed latching projections is separated by said groove means into a lower portion having a first radial distance from an access of said grab means and an upper portion having a greater distance to said axis.

* * * * *